(12) United States Patent
Bryant

(10) Patent No.: US 8,370,167 B2
(45) Date of Patent: Feb. 5, 2013

(54) SYSTEM AND METHOD OF PERFORMING AN ENGINEERING-BASED SITE DEVELOPMENT AND RISK ASSESSMENT PROCESS

(75) Inventor: John Bryant, Carrollton, TX (US)

(73) Assignee: Bryant Consultants, Inc., Carrollton, TX (US)

(*) Notice: Subject to any disclaimer, the term of this patent is extended or adjusted under 35 U.S.C. 154(b) by 355 days.

(21) Appl. No.: 12/798,523

(22) Filed: Apr. 5, 2010

(65) Prior Publication Data
US 2010/0280862 A1 Nov. 4, 2010

Related U.S. Application Data

(63) Continuation-in-part of application No. 10/689,290, filed on Oct. 20, 2003, now Pat. No. 7,693,724.

(51) Int. Cl.
*G06Q 10/00* (2012.01)
(52) U.S. Cl. .......................... 705/1.1; 705/7.28; 705/301
(58) Field of Classification Search ................... 705/1.1, 705/300–301, 348
See application file for complete search history.

(56) References Cited

U.S. PATENT DOCUMENTS

| | | | |
|---|---|---|---|
| 4,755,944 A | 7/1988 | Glass | |
| 4,781,599 A * | 11/1988 | Dowd | 434/364 |
| 5,021,976 A | 6/1991 | Wexelblat | |
| 5,373,443 A | 12/1994 | Lee | |
| 5,914,603 A | 6/1999 | Daily | |
| 6,055,481 A | 4/2000 | Johansen | |
| 6,147,497 A | 11/2000 | Berryman | |
| 6,295,512 B1 | 9/2001 | Bryant | |
| 6,397,202 B1 | 5/2002 | Higgins et al. | |
| 6,574,566 B2 | 6/2003 | Grismore | |
| 6,675,127 B2 | 1/2004 | LaBlanc et al. | |
| 7,139,999 B2 | 11/2006 | Bowman-Amuah | |
| 7,441,197 B2 | 10/2008 | Tschiegg et al. | |
| 2002/0129221 A1 * | 9/2002 | Borgia et al. | 712/1 |
| 2003/0065641 A1 * | 4/2003 | Chaloux | 707/1 |
| 2003/0088446 A1 | 5/2003 | Phelps et al. | |
| 2003/0160818 A1 | 8/2003 | Tschiegg et al. | |
| 2003/0167180 A1 | 9/2003 | Chung et al. | |
| 2003/0182337 A1 | 9/2003 | Wefers et al. | |

* cited by examiner

*Primary Examiner* — Candice D Wilson
(74) *Attorney, Agent, or Firm* — Schultz & Associates, P.C.

(57) ABSTRACT

A system and method is provided for on-site site risk assessment and to encourage collaboration between professional disciplines related to land development and construction projects. A graphical risk analysis system is provided based on answers to interdisciplinary questions related to risks. Use of the system promotes a complete checklist of interdisciplinary and informational consultation which, when completed for a project, assesses the risk related to land development and allows for reduction in risk as the project progresses.

9 Claims, 14 Drawing Sheets

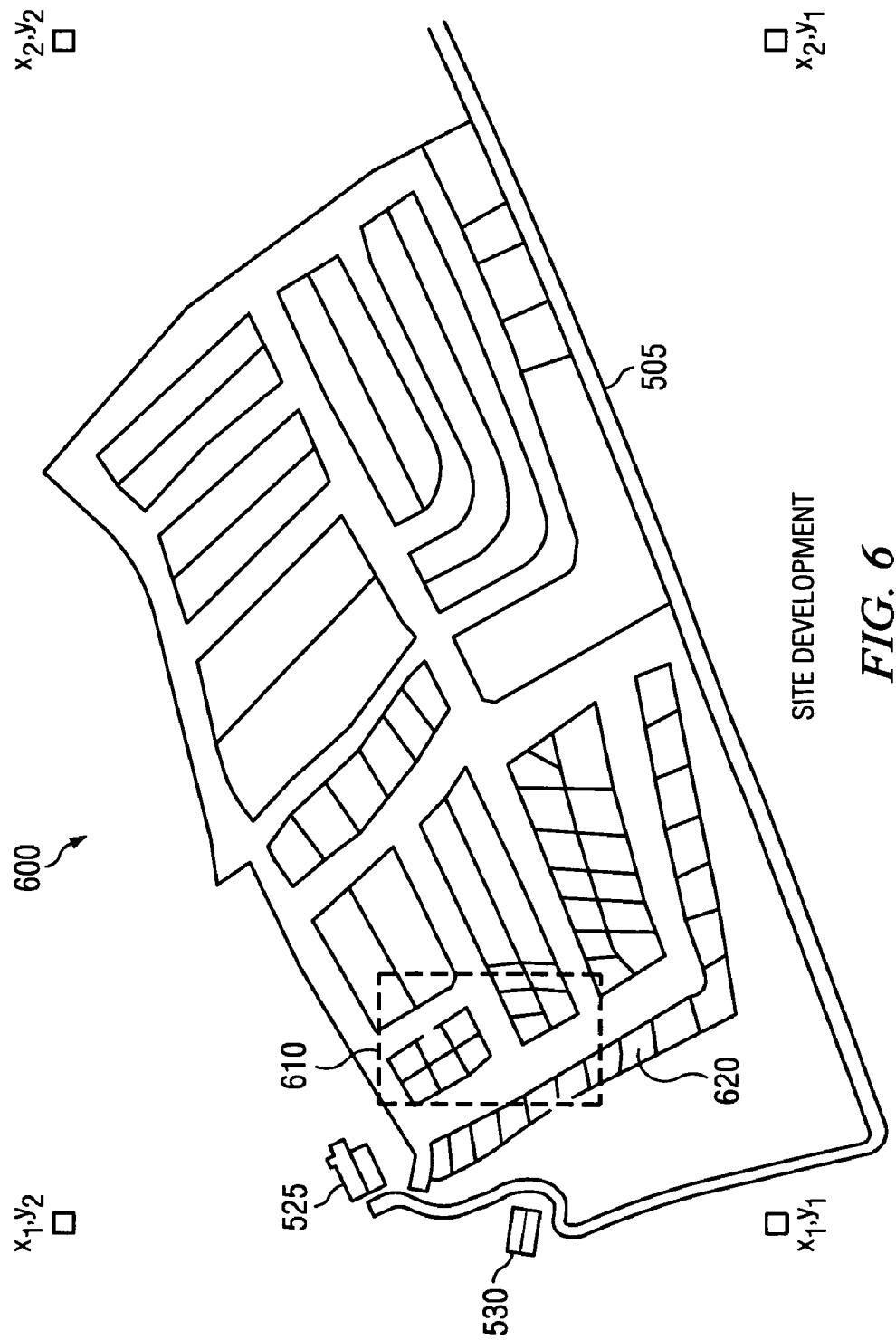

STRUCTURAL

SYSTEM AND METHOD OF PERFORMING AN ENGINEERING-BASED SITE DEVELOPMENT AND RISK ASSESSMENT PROCESS

CROSS-REFERENCE TO RELATED APPLICATIONS

This application is a Continuation-In-Part claiming priority benefit from U.S. patent application Ser. No. 10/689,290 entitled "Multidiscipline Site Development and Risk Assessment Process" filed on Oct. 20, 2003, now U.S. Pat. No. 7,693,724.

FIELD OF INVENTION

This invention relates to a system and method to encourage collaboration between various disciplines and more particularly to a system to encourage collaboration between various engineering disciplines related to land development and building construction projects.

BACKGROUND OF THE INVENTION

Many engineering professionals are required in order to complete a large building construction project. Numerous consultations with civil, environmental, structural and geotechnical engineers as well as land and site development professionals are required.

Information from each engineering discipline must be shared in order to coordinate various aspects of the construction project and reduce risks. A risk assessment "protocol" is usually developed on a case by case basis to qualitatively address the risks at a particular site in order to reduce the degree of uncertainty.

The prior art does not provide a useful and uniform method to assess site development risks and reduce the uncertainty involved in a construction project.

Therefore, a system and method are needed that encourage collaboration between professionals in different engineering disciplines working on large construction projects. The system should allow information to be easily accessible to each professional and project management. The system should statistically and/or qualitatively address the known risks and reduce the degree of uncertainty for a construction project. Further, the system should function at a construction site. Therefore, the system should be capable of manual operation, function with minimal or no electrical power and be resistant to weather and other rugged worksite conditions.

SUMMARY OF THE INVENTION

One preferred embodiment provides a transparency system that utilizes light reflectivity and transmissivity to convey information with a series of overlay sheets. The system is designed to encourage collaboration between various engineering disciplines related to land development and construction projects.

The preferred embodiment provides a semi-transparent overlay related to each engineering discipline. Each overlay provides a checklist of interdisciplinary and informational consultations which, when completed, reduces the risk related to site development. Each overlay displays a data section including questions which are related to the disciplines. For instance, in the "civil engineering" section, questions are posed which relate to roads and streets, fill and cut, erosion control, drainage and grades in the location of the project. In the "site development" section, questions are posed which relate to grades, water, soil type, vegetation, fill, and property maintenance. In the "environmental engineering" section, questions are posed which relate to historical usage at the project area. In the "structural engineering" section, questions are posed which relate to the design of the foundation system, slab thickness, steel usage and beam construction. In the "geotechnical engineering" section questions are posed which relate to subsurface moisture, inclusions and geological anomalies.

The questions are accessed and answered by a professional trained in each field. Once each of the questions has been answered, a user observes the completed answers and accesses a key that correlates "risks" with the answers provided. The "risks" may include warnings and reminder messages related to certain topics such as pre-existing conditions, suggested meetings between various disciplines, or additional information which may be needed. These "risks" may be associated with contact information for the engineers responsible for a particular task or discipline in order to promote communication between the various disciplines.

The graphics section provides an efficient method for identifying potential problems. The responses in the data section provide a way to statistically analyze the risks associated with site development by accessing the key that correlates responses to "risks".

The preferred embodiment is an improvement over the prior art because it provides a statistical method of evaluating risk based on interdisciplinary questions related to site development, is easily accessible to individuals in different project progressions and encourages collaboration between individuals, and because it provides a visual method of ascertaining risks and addressing those risks at a particular construction site to reduce the degree of uncertainty.

An alternate embodiment provides a transparency system that operates based on light traveling through the overlay sheets. The transparency system benefits from the use of a light table or a light source placed directly behind the binder holding the overlays.

Those skilled in the art will further appreciate the above-mentioned features and advantages of the invention together with other important aspects upon reading the detailed description that follows in conjunction with the drawings.

DETAILED DESCRIPTION OF THE DRAWINGS

A better understanding of the invention can be obtained from the following detailed description of one exemplary embodiment as considered in conjunction with the following drawings in which:

FIG. 1 shows a side view of an overlay binder.
FIG. 2 shows a top view of an overlay binder.
FIG. 3A shows a top view of a single overlay.
FIG. 3B shows a top view of a single overlay.
FIG. 4 shows an isometric view of a light ray in relation to a set of overlays.
FIG. 5 shows a partial view of an aerial map overlay.
FIG. 6 shows a plat map overlay.
FIG. 7A shows a fill map overlay.
FIG. 7B shows a combined fill map overlay, aerial map overlay and plat map for overlay.
FIG. 8 shows a detail view of a building site.
FIG. 9 shows a vertical resistivity map.
FIG. 10A shows a partial view of a horizontal electrical resistivity map overlay.
FIG. 10B shows electrical resistivity map overlay with a fill map overlay.

DETAILED DESCRIPTION OF EXEMPLARY EMBODIMENTS

Figure 1:
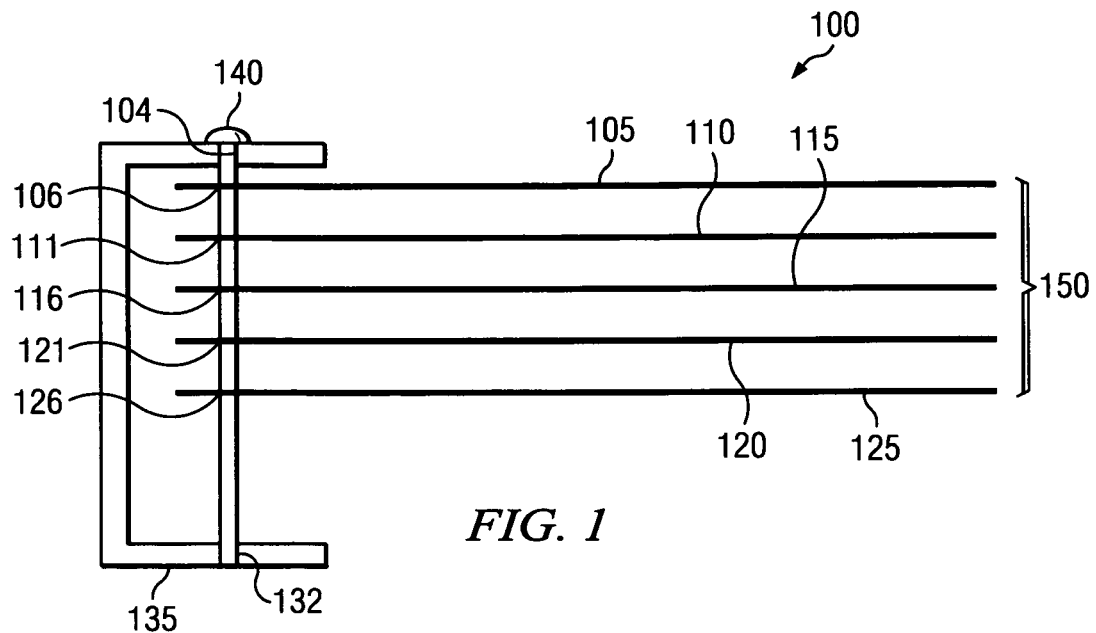

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

The exemplary embodiments described herein relate to a transparency based risk assessment system for construction projects. The disclosed embodiments do not particularly utilize a computer system for field use, although computer systems including associated programs, memory, storage and printing capabilities may be used to generate the transparency materials. As for a computer based risk assessment system, patent application Ser. No. 10/689,290 to Bryant discloses such a risk assessment system requiring a computer system which is hereby incorporated by reference in its entirety.

A first embodiment of the present invention is comprised of a transparency system allowing the viewing of multiple overlays. The overlays are held in place and indexed by a retaining pin and a binder system. This system allows viewing of multiple transparencies with visual and data information along with identification information as to the identity of each engineering professional responsible for each engineering aspect of the project.

Moving then to FIG. 1, transparency system 100 consists of overlay set 150 comprising overlays 105, 110, 115, 120, and 125. The number of overlays may vary depending on the number of engineering disciplines addressed and the complexity of the construction project. The overlays include retaining holes 106, 111, 116, 121, and 126. Retaining pin 140 passes through hole 104 in binder 135 and threads into hole 132. The overlays are held in place by binder 135 and retaining pin 140 as known in the art.

Figure 2:
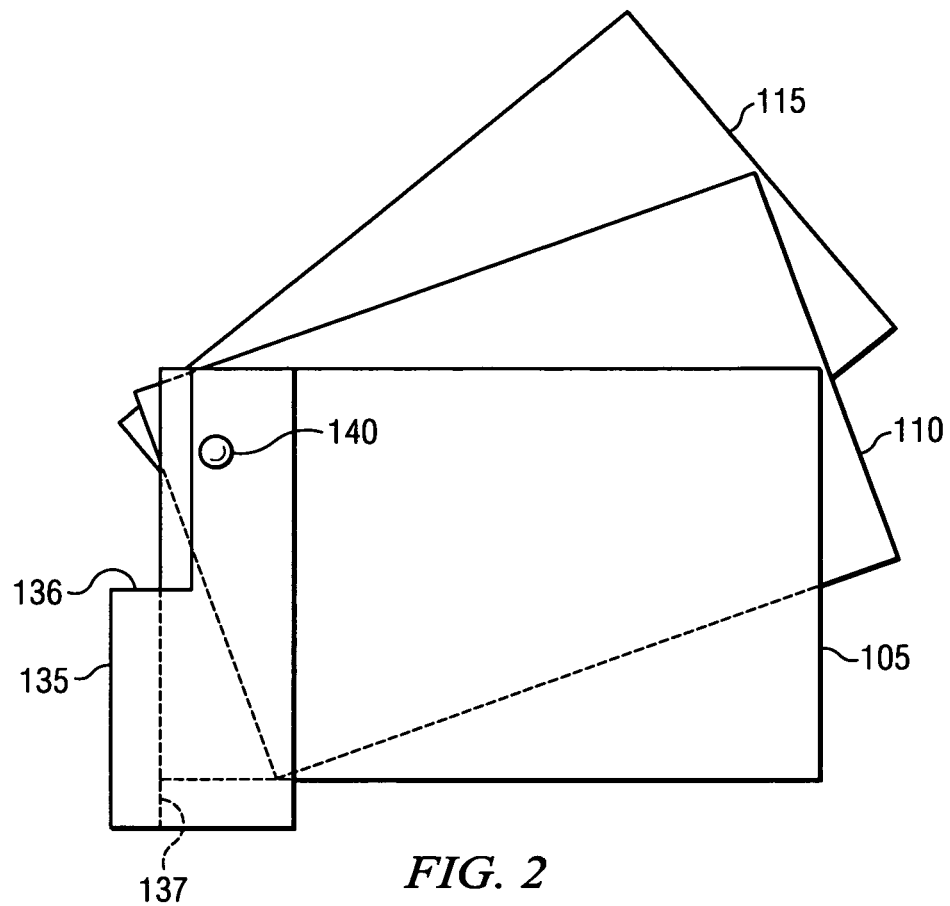

As shown in FIG. 2, binder 135 includes rectangular indention 136. The rectangular indention in cooperation with retaining pin 140 allows the overlays to pivot into varied angular positions with respect to each other and with respect to binder 135. The various angular positions allow the overlays to be viewed together, separately or in various combinations to arrive at different views. An alignment surface 137 is also provided in binder 135. In use, each overlay may abut the alignment surface in order to align each overlay with the others.

Figure 3A:
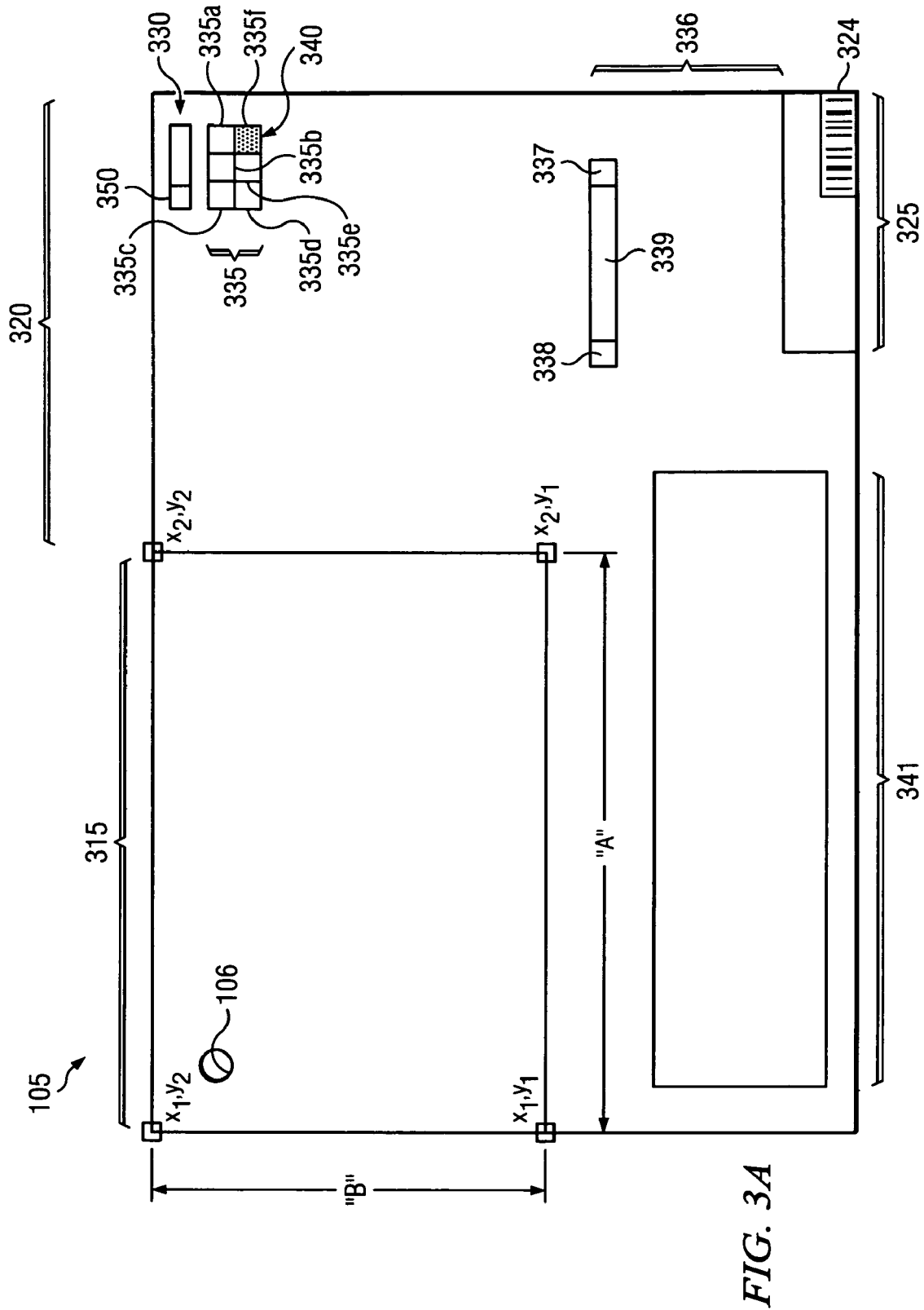
Figure 3B:
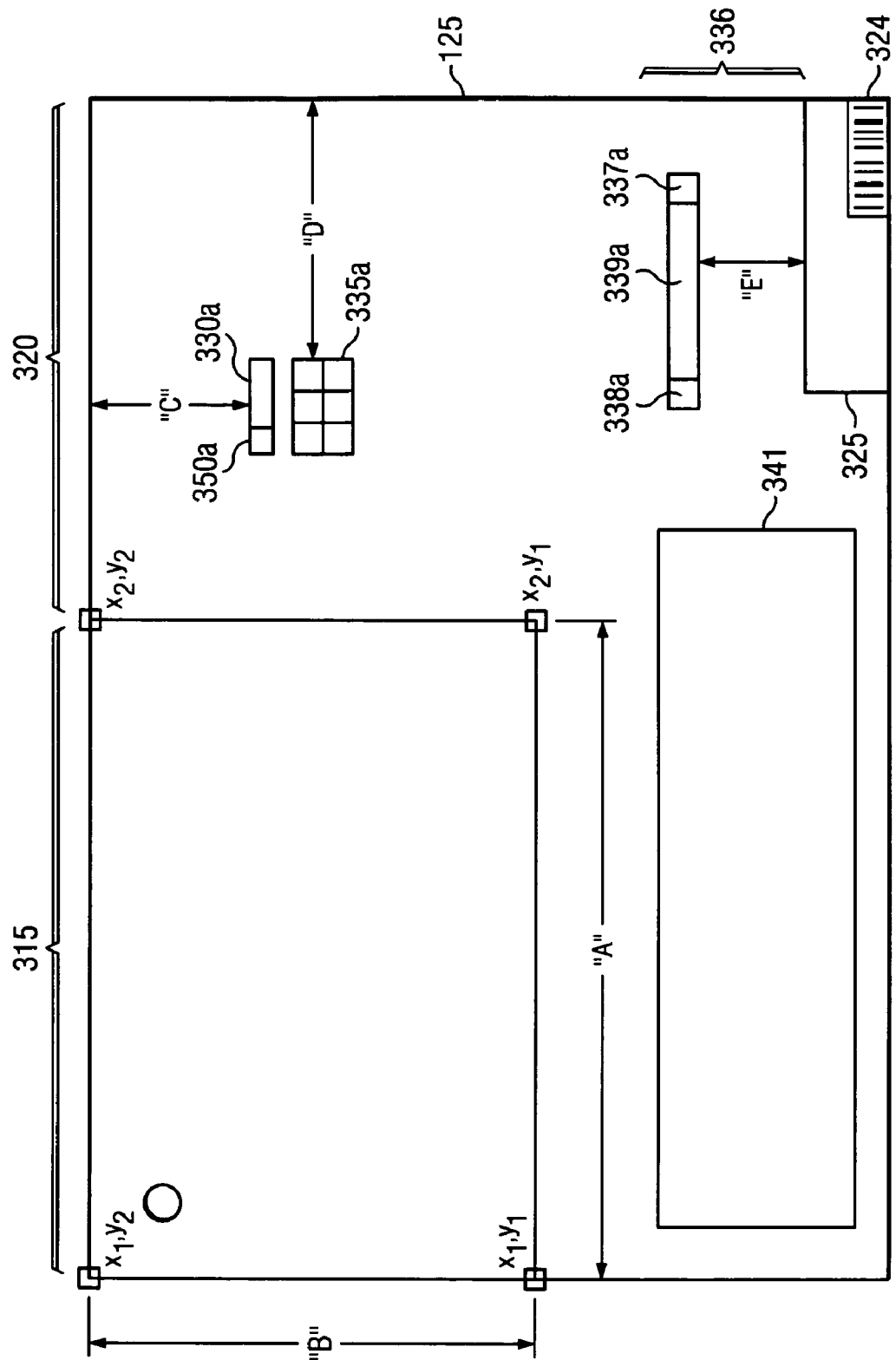
Figure 11:
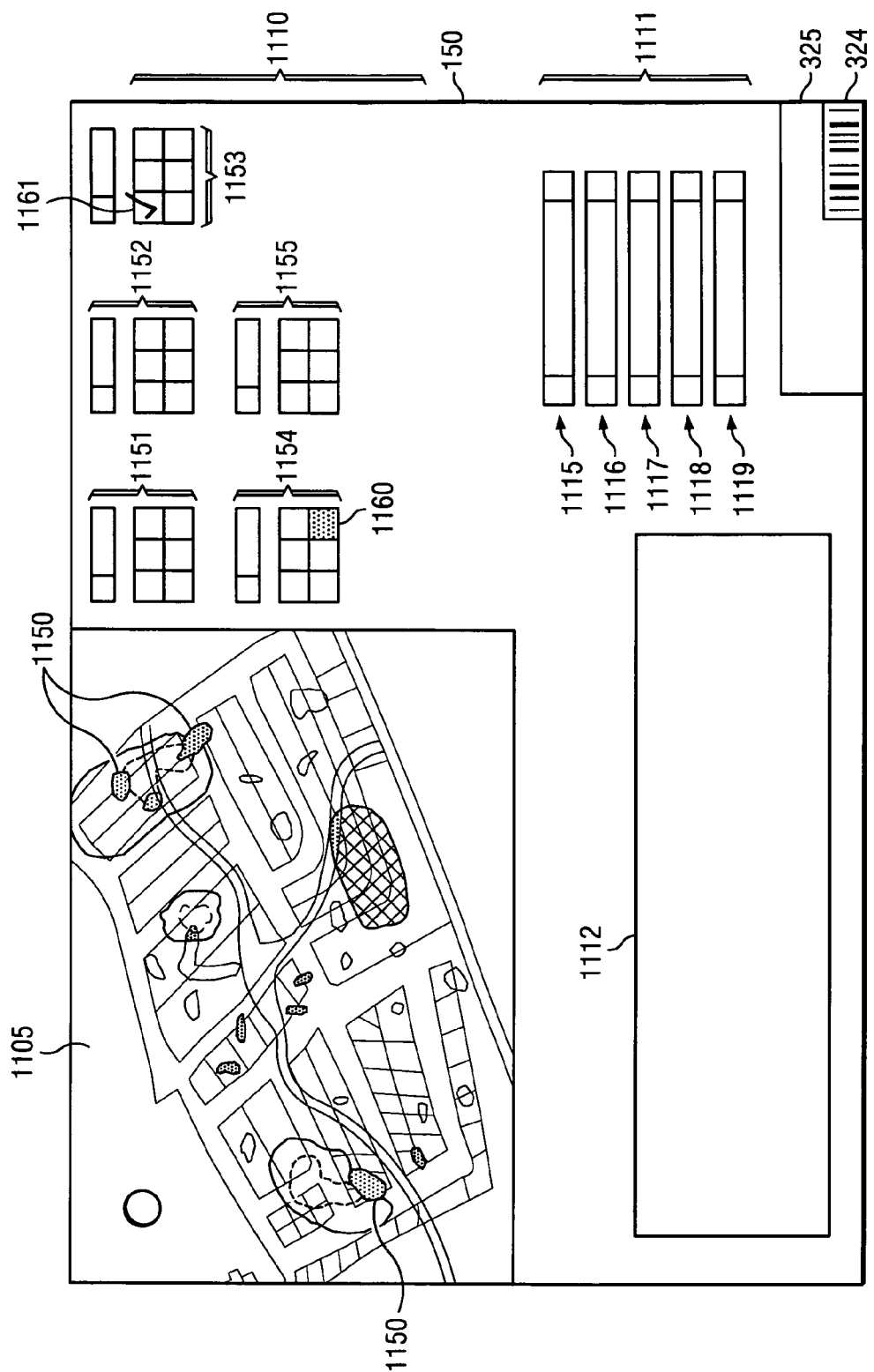
FIG. 11 shows a combined view of multiple overlays, including the graphical and data sections.

Referring to FIGS. 3A, 3B and 11, the overlays will be described. Each overlay is comprised of graphics section 315, data section 320, identification section 325, contact section 336 and key section 341. In this example, overlay 105 is assigned to the discipline of "civil engineering".

Identification section 325 allows for identification of project information, inception and completion dates and revision information for the overlay. In the preferred embodiment, bar code 324 is provided for automated logging of the overlay. As a project progresses, the overlay may be revised to include new questions. New questions may be added to set of questions 330 as each question is answered or the task relating to each question has been completed. The engineering professional in charge of a task may be replaced and the contact information updated in a revision to overlay 105. Thus, identification section 325 serves to track the revision of the overlay.

Contact section 336 includes contact information for engineering professionals for those in charge of the disciplines of civil engineering, environmental engineering, site development, structural engineering and geotechnical engineering. For each discipline, there is a section for contact information 339, status active 338 and status inactive 337. "Status active" indicates that the individual is currently working on the project. Conversely, "status inactive" indicates that the individual is no longer working on the project.

Each overlay also includes risk key section 341 including the listing of question IDs and questions for its assigned discipline and including a text version of the risks and risk IDs.

Question identification number 350 correlates to a specific risk identified in risk key section 341. Risk key section 341 correlates appropriate responses to specific questions by specific disciplines with a risk and a curative action.

The risk data section 320 graphically groups and displays risks which have been generated by professionals in the civil engineering section 1151, the environmental section 1152, the site development engineering section 1153, the structural engineering section 1154, and geotechnical engineering section 1155. The risks displayed are derived from key section 341 for all risks associated with the project. The generated risks are tasks for the viewer to perform.

Risk data section 320 is comprised of a set of question boxes 330 and a set of response boxes 335, of which each response box has an associated set of responses 340, and of which each response box is associated to one question box in the set of question boxes 330. Each set of responses is prompted by a question in an associated question box. Each question residing in set of question boxes 330 is identified by a question identification number 350.

In general, the question boxes and response boxes are specific to the engineering discipline addressed by each overlay. However, some questions and responses are common among the engineering disciplines. In this case, the questions boxes and the response boxes are positioned in the same relative position on each overlay so that the responses overlap.

In a preferred embodiment, responses 340 are mapped to the response boxes 335 as follows. As in Table 1, first response indicates 335a the discipline code (C, D, E, G, and S). Four responses 335b, 335c, 335d, and 335e form a response list and indicate each of the "YES", "NO", "SKIP", "DNK" risk identifiers from Table 2, respectively. A sixth response, 335f, includes the completion status indicators: green check mark, yellow warning sign or red stop sign.

In another embodiment, each response box in set of response boxes 335 is pre-labeled with a letter indicating which discipline should use the respective response box to answer the question presented in the associated question box. The letter is lightly shaded, also known as "ghost script", so as not to obscure responses in overlays below it. Alternatively, a single grid of letters corresponding to the set of response boxes 335, may be placed on the bottom-most overlay. Preferably this grid would be highly reflective, so that the letters could be seen through all layers of overlays.

In another embodiment, responses 340 may be in the form of a written word or a symbol from a response library. For example, a question may ask if a job is started, is not started, is completed, or if the answer is not known? Proper responses might be: for a job that is started but not completed—an "S";

for a job that is completed a "C"; for a job that is not started "N"; and for unknown "?". The response library may be communicated in an additional information section, one information section for each overlay or alternatively one information section for the set of overlays for the project, so that appropriate responses are available to the user.

In a preferred embodiment, the graphical presentation of risks includes yellow warning signs as uncompleted risk areas 1160 and green check marks as completed risk areas 1161. If a risk area is overdue, a red stop sign is depicted. The overlaid data response section 1110 allows the viewer to view a graphical risk analysis totaling the number of check marks and the number of warning signs displayed. The larger number of unchecked risks shows a greater amount of risk to the completion of the project. Simply adding the number of completed boxes numerically and dividing by the total provides a statistical measure of risk evaluation.

If one uncompleted risk area requires the viewer to inquire about a specific discipline, then the user may use the overlay contact section 1111 to identify the appropriate person responsible for the risk. Each contact person and each risk are all visible from the overlay set without moving any of the overlays by the viewer.

Civil engineering discipline questions include questions relating to the civil engineering aspects of the project. Such questions may include: Have you participated in an early development, pre-construction meeting to evaluate potential civil site challenges? Has the civil engineer provided positive grades on each of the building lots? Has sufficient pad design been done to avoid excessive cut and fill beneath the building pads? Has the erosion control been addressed in the civil engineering report? Have retaining structures been identified for this site? Has the civil engineer provided control of surface and subsurface water migration, if the potential exists? Have the final grades and drainage been validated as specified in the civil engineering design document?

Site development engineering discipline questions include questions relating to the development of the project site. Such questions may include: Does the tree canopy extend over the building site pad? Have there been prior roads, fences, and trails that existed at this site? Does this site have expansive soils? Does this site have excessive elevation changes? Have there been cuts or fills on pads that exceed five feet? Are there proper positive drainage grades away from the homes? Are there variable soil types at this site? Is there known surface or subsurface water present at this site? Have the homeowners been informed about the importance of proper maintenance?

Environmental engineering discipline questions include questions relating to the environment surrounding the project site for the user to answer. Such questions may include: Have you participated in an early development, pre-construction meeting to evaluate potential environmental site challenges? Have aerial photographs and other applicable maps been reviewed to access present and prior land usage? Have there been any environmental issues that need to be communicated at this site?

Geotechnical engineering discipline questions include "ground related" questions. Such questions may include: Have you participated in an early development, pre-construction meeting to evaluate potential geotechnical site challenges? Has a geotechnical report that included all available sub surface information been provided to you? Have there been a sufficient number of spatial densities of soil boring to characterize the soils at the site? Were the grading operations complete prior to the geotechnical investigation? Has the placement of fill been tested for density and moisture content? Have any known or expected unfavorable site and sub surface conditions been identified at this site? Has the geotechnical report provided recommendations for foundation systems, and have associated risks been defined for each? Has the geotechnical report provided suitable design parameters for the foundation system? Have soil treatment options been identified and recommended in the geotechnical report?

Structural engineering discipline questions include questions relating to the structure or building. Such questions may include: Have you participated in an early development, pre-construction meeting to evaluate potential structural site challenges? Have you received a structural plan from the structural engineer? Have you had a pre-pour verification of conformance of the as-built conditions with the foundation design? Have you had a post-pour verification of conformance of the as-built conditions with the foundation design?

Table 1 shows an exemplary list of questions for use in set of question boxes 330. The user identifies risk by matching the risk identification number in the risk key and correlating it with the "yes", "no", "skip", or "dnk" (do not know) response supplied by a given discipline.

TABLE 1

| ID | Area | Question | YES | NO | SKIP | DNK |
|----|------|----------|-----|-----|------|-----|
| 37 | C | Have you participated in an early development, pre-construction meeting to evaluate potential civil site challenges? | 0 | 102 | 0 | 103 |
| 19 | C | Has the civil engineer provided positive grades on each of the building lots? | 0 | 104 | 0 | 105 |
| 20 | C | Has sufficient pad design been done to avoid excessive cut and fill beneath the building pads? | 0 | 104 | 0 | 107 |
| 21 | C | Has the erosion control been addressed in the civil engineering report? | 0 | 108 | 0 | 109 |
| 22 | C | Has retaining structures been identified for this site? | 110 | 0 | 0 | 111 |
| 23 | C | Has civil engineer provided control of surface and subsurface water migration, if the potential exists? | 0 | 112 | 0 | 113 |
| 24 | C | Have the final grades and drainage been validated as specified in the civil engineering design document? |  | 114 | 0 | 115 |
| 29 | D | Does the tree canopy extend over building site pad? | 122 | 0 | 0 | 123 |
| 30 | D | Have there been prior roads, fences, and trails that existed at this site? | 124 | 0 | 0 | 125 |
| 31 | D | Does this site have expansive soils? | 127 | 0 | 0 | 128 |
| 38 | D | Does this site have excessive elevation changes? | 138 | 0 | 0 | 139 |
| 32 | D | Have there been cuts or fills on pads that exceed five feet? | 129 | 0 | 0 | 130 |

TABLE 1-continued

| ID | Area | Question | YES | NO | SKIP | DNK |
|----|------|----------|-----|-----|------|-----|
| 33 | D | Are there proper positive drainage grades away from the homes? | 0 | 131 | 0 | 132 |
| 34 | D | Are there variable soil types at this site? | 133 | 0 | 0 | 134 |
| 35 | D | Is there known surface or subsurface water present at this site? | 135 | 0 | 0 | 136 |
| 36 | D | Have the homeowners been informed about the importance of proper maintenance? | 0 | 137 | 0 | 137 |
| 7 | E | Have you participated in an early development, pre-construction meeting to evaluate potential environmental site challenges? | 0 | 85 | 0 | 86 |
| 8 | E | Have aerial photographs and other applicable maps been reviewed to access present and prior land usage? | 0 | 87 | 0 | 87 |
| 10 | E | Have there been any environmental issues that need to be communicated at this site? | 88 | 0 | 0 | 89 |
| 11 | G | Have you participated in an early development, pre-construction meeting to evaluate potential geotechnical site challenges? | 0 | 90 | 0 | 91 |
| 12 | G | Has a geotechnical report that included all available sub surface information been provided to you? | 0 | 92 | 0 | 92 |
| 13 | G | Has there been a sufficient number of spatial densities of soil borings to characterize the soils at the site? | 0 | 93 | 0 | 94 |
| 14 | G | Were the grading operations complete prior to the geotechnical investigation? | 0 | 95 | 0 | 95 |
| 15 | G | Has the placement of fill been tested for density and moisture content? | 0 | 96 | 0 | 97 |
| 16 | G | Has any known or expected unfavorable site and sub surface conditions been identified at this site? | 0 | 98 | 0 | 98 |
| 9 | G | Has the geotechnical report provided recommendations for foundation systems, and have associated risks been defined for each? | 0 | 99 | 0 | 100 |
| 17 | G | Has the geotechnical report provided suitable design parameters for the foundation system? | 0 | 101 | 0 | 100 |
| 18 | G | Have soil treatment options been identified and recommended in the geotechnical report? | 0 | 101 | 0 | 100 |
| 25 | S | Have you participated in an early development, pre-construction meeting to evaluate potential structural site challenges? | 0 | 116 | 0 | 117 |
| 26 | S | Have you received structural plan from the structural engineer? | 0 | 118 | 0 | 119 |
| 27 | S | Have you had a pre-pour verification of conformance of the as-built conditions with the foundation design? | 0 | 120 | 0 | 120 |
| 28 | S | Have you had a post-pour verification of conformance of the as-built conditions with the foundation design? | 0 | 121 | 0 | 121 |

The "ID" column in Table 1 displays the question identification number 350 of the question. The "area" column displays the discipline corresponding to the question. For example, in one preferred embodiment, the following discipline codes, C=Civil, D=Site Development, E=Environmental, G=Geotechnical, and S=Structural. The "question" column contains the text of the question that is presented to the user in question box 330. The "yes", "no", "skip", and "dnk" (do not know) columns display a set of risk ID numbers assigned to each response for each question.

Table 2 shows an exemplary list of risks which may be presented in the key section:

TABLE 2

| ID | Area | Risk |
|----|------|------|
| 102 | C | Setup up a meeting with all interested parties on civil engineering site challenges. |
| 103 | C | Meeting needed to reduce information gaps, communicate process, and reduce risk. |
| 104 | C | Contact your land developer about positive grades on each of the building lots. |
| 105 | C | Determine grade requirements for this site, BCI recommend 2% grade eight feet from the perimeter of a structure. |
| 106 | C | Contact land developer regarding higher risk involved with excessive cut and fill. |
| 107 | C | Review cut and fill information. |
| 108 | C | Contact civil engineer for an erosion control recommendation. |
| 109 | C | Review civil engineer report for erosion control recommendations. |
| 110 | C | Review detail design of structural engineer. |

TABLE 2-continued

| ID | Area | Risk |
|---|---|---|
| 111 | C | Review civil engineer design plans for retaining structure. |
| 112 | C | Contact Bryant Consultants Inc. on a plan of action on surface and subsurface water migration. |
| 113 | C | Review risks associated with perched ground water. |
| 114 | C | Contact civil engineer to validate the final grades and drainage. |
| 115 | C | Contact the land developer to see if the final grades and drainage has been validated. |
| 122 | D | Review remediation techniques for trees. |
| 123 | D | Determine if the canopy of the trees at this site extend over building site pads. |
| 124 | D | Consider possible soil treatments for the affected areas of historical usage. |
| 125 | D | Contact Earth Systems Technologies to discuss course of action on historical land usage study. |
| 127 | D | Consider soil treatment method(s) to help reduce the soil movement potential and the corresponding reduction in predicted movement. |
| 128 | D | Review geotechnical report concerning soil types. |
| 129 | D | Review compaction, treatments, and possible deep foundation requirements. |
| 130 | D | Contact Earth Systems Technologies to discuss course of action on grade analysis study. |
| 131 | D | Contact civil engineer on the correction of grades around the home. |
| 132 | D | Determine proposed grades around the homes at this site. |
| 133 | D | Contact geotechnical and site development engineers to identify variable soil risks. |
| 134 | D | Contact Earth Systems Technologies to discuss course of action on variable soil analysis study. |
| 135 | D | Contact geotechnical engineer to identify the lot(s) where known perched water conditions may exist. |
| 136 | D | Contact Earth Systems Technologies to discuss course of action on identifying perched water conditions. |
| 137 | D | Develop a process for individual homeowners to review the maintenance requirement of their new home. |
| 138 | D | Consider the usage of designed retaining structures. Contact the civil, geotechnical and structural engineers. |
| 139 | D | Excessive elevation changes may result in excessive cuts and fills, slope failures, and thus, should be strongly considered in the overall type of foundation system. |
| 85 | E | Setup up a meeting with all interested parties on environmental site challenges. |
| 86 | E | Meeting needed to reduce information gaps, communicate process, and reduce risk. |
| 87 | E | Contact Earth Systems Technologies to discuss course of action on historical land usage study. |
| 88 | E | Inform all interested parties about environmental issues related to this site. |
| 89 | E | Contact Land Developer to ask for environmental impact study. |
| 90 | G | Setup up a meeting with all interested parties on geotechnical site challenges. |
| 91 | G | Meeting needed to reduce information gaps, communicate process, and reduce risk. |
| 92 | G | Contact your land developer about getting a copy of the geotechnical report. |
| 93 | G | Additional geotechnical and or geophysical data is needed at the site. Contact the geotechnical engineer. |
| 94 | G | Refer to recommended guidelines and industry standards for spatial boring density for subdivisions and individual lots. |
| 95 | G | Contact geotechnical engineer to see if finished pad elevations alter the original geotechnical recommendations. |
| 96 | G | Contact your land developer, geotechnical, and structural engineers about testing fill materials. |
| 97 | G | Improperly compacted fill can result in excessive settlement which can cause differential foundation movement primarily in slab on grade foundations. Fill soils placed in a dry stated can result in excessive upward differential movements. |
| 98 | G | Contact Earth Systems Technologies for a plan of action to identify unfavorable site and sub surface conditions. |
| 99 | G | Contact geotechnical engineer for recommended foundation systems. |
| 100 | G | Review Pros and Cons of foundation design. |
| 101 | G | Contact the geotechnical engineer for design parameters. |
| 116 | S | Setup up a meeting with all interested parties on structural site challenges. |
| 117 | S | Meeting needed to reduce information gaps, communicate process, and reduce risk. |
| 118 | S | Contact the structural engineer for a copy of their plan. |
| 119 | S | Contact the land developer regarding structural engineer plan. |

TABLE 2-continued

| ID | Area | Risk |
|---|---|---|
| 120 | S | Contact structural engineer to arrange an appointment to inspect as-built prior to pour. |
| 121 | S | Contact structural engineer to arrange an appointment to inspect as-built after the pour. |

The ID column in Table 2 displays the risk ID number of an associated question. The area column displays the discipline to which the question corresponds. In this example, the following codes and disciplines are used, C=Civil, D=Site Development, E=Environmental, G=Geotechnical, and S=Structural.

Graphics section 315 provides visual cues and data relating to the building site. Examples of data relating to the building site include building layouts, aerial maps, plat maps, fill maps and electrical resistivity maps. The overlays have a defined set of dimensions "A" and "B" indicating a scale, so that each graphics section corresponds to the same scale on each overlay and appears the same place on each overlay. Furthermore, each graphics section corresponds to the same physical longitudinal and latitudinal coordinates so that the same geographic location is depicted. In this example, the coordinates are shown defining a rectangle $(x_1, y_1)$, $(x_2, y_1)$, $(x_2, y_2)$, $(x_1, y_2)$.

Referring then to FIG. 3B, overlay 125 is described as a second example. In general, overlay 125 also includes graphics section 315, risk data section 320, contact section 336, identification section 325 and key section 341. However, it is noted that question ID 350a, question boxes 330a, and responses 335a are shifted in position by the vertical distance "C" and horizontal distance "D". Similarly, status active 330a, contact information box 339a and status inactive box 337a are shifted vertically by a distance "E".

Referring to FIG. 11, when each of overlays 105, 110, 115, 120 and 125 are assembled, the transparent nature of the overlays and the relative positions of the question boxes, response boxes and contact information boxes allow a viewer to see each set for each discipline at the same time. As shown on FIG. 11, overlay set 150 includes a set of question boxes and response boxes for civil engineering 1151, environmental engineering 1152, site development engineering 1153, structural engineering 1154, and geotechnical engineering 1155. Similarly, overlay set 150 includes contact information for civil engineering 1115, environmental engineering 1116, site development engineering 1117, structural engineering 1118, and geotechnical engineering 1119. Furthermore, as can be seen in overlaid graphics section 1105, all graphical cues are visible in varying degrees at the same time from each of overlays 105, 110, 115, 120 and 125.

Figure 4:
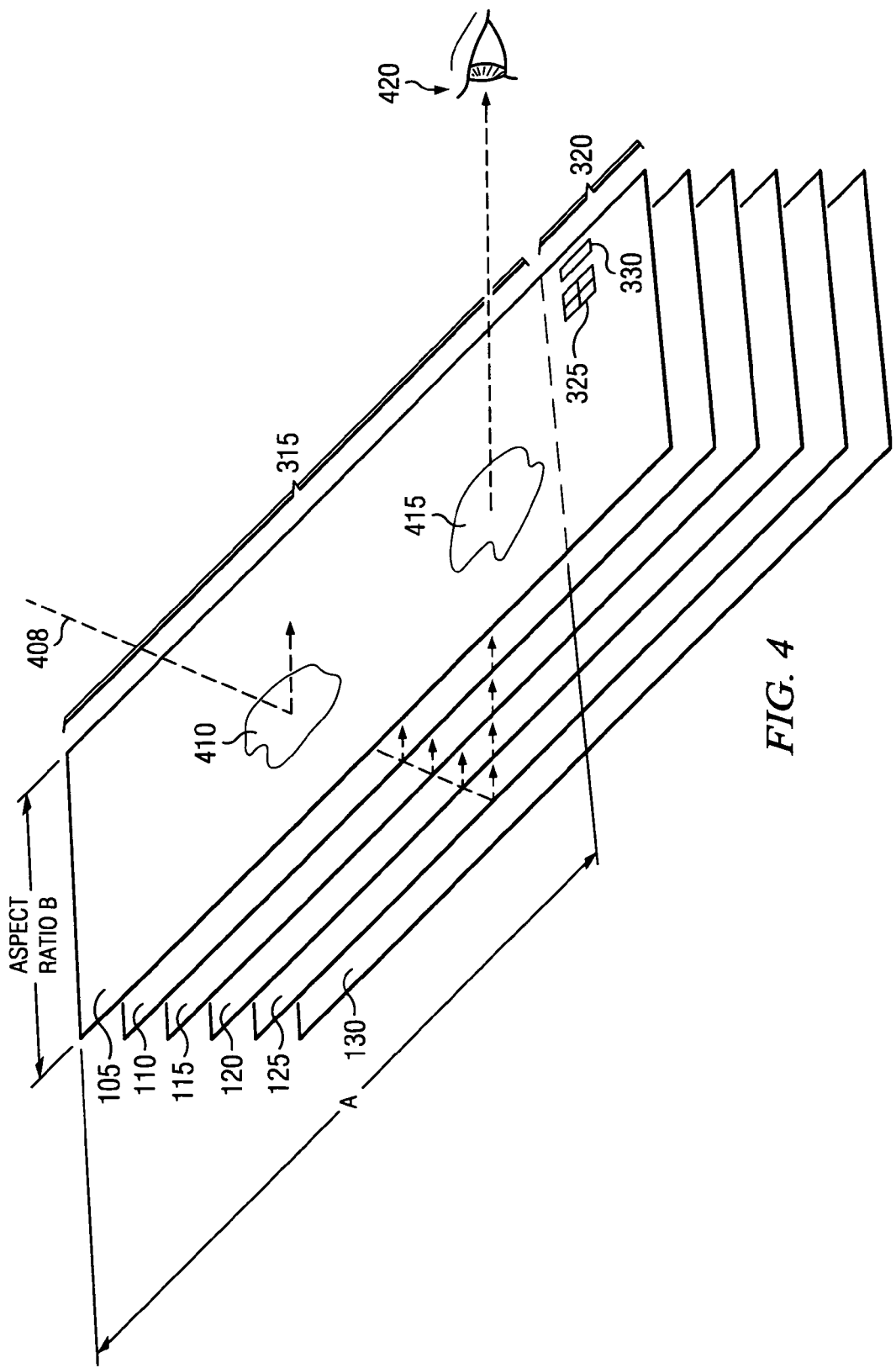

FIG. 4 describes the system in use. In use, light ray 408 passes through each of the overlays individual overlays being partially reflected from images on individual sheets, so that a viewer at vantage point 420 observes a composite image of the combined overlays.

Figure 5:
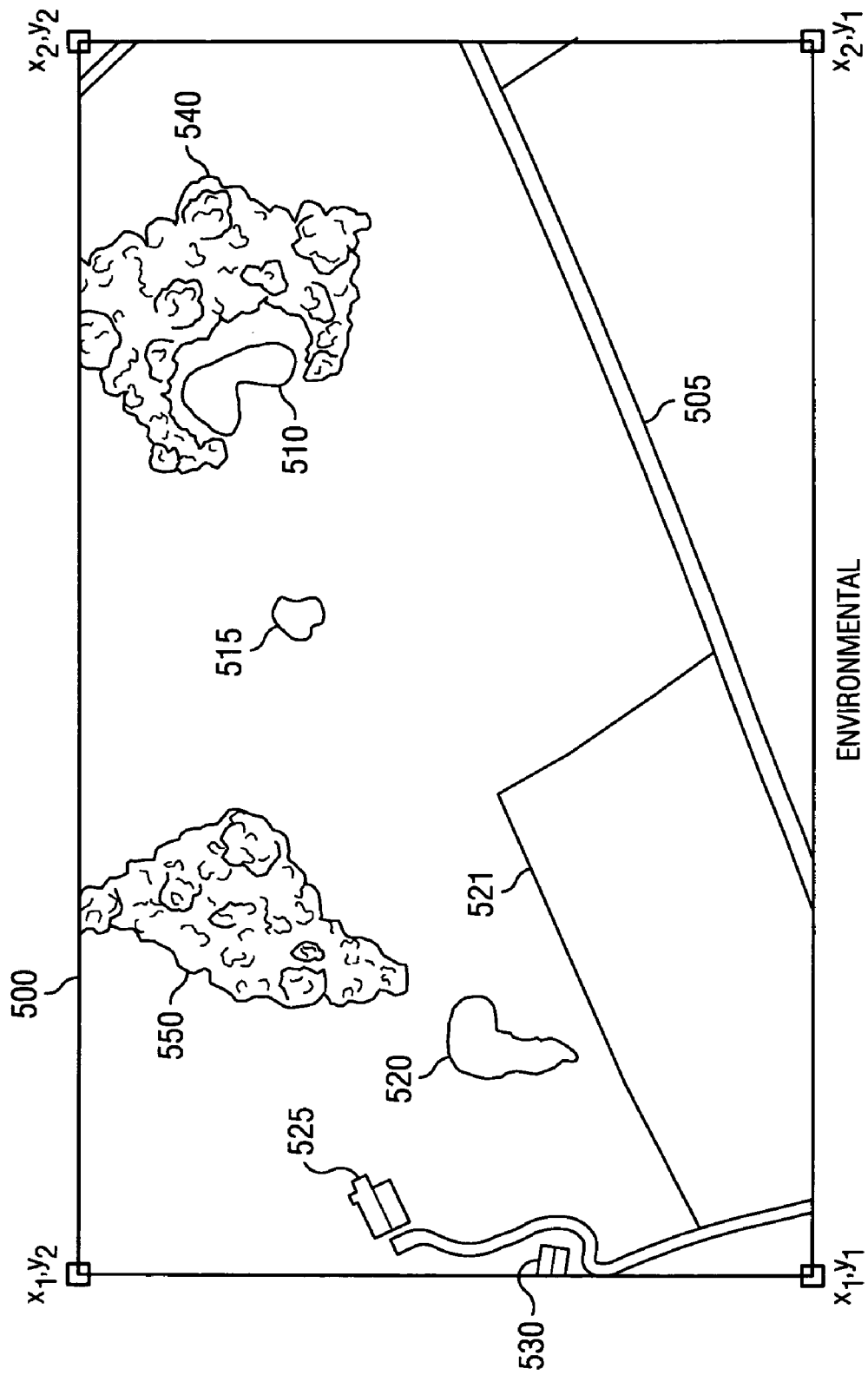

FIG. 5 shows an overlay which includes a graphical representation of the physical features of a worksite associated with the structural engineering discipline. The physical features may be located and identified by methods such as aerial photographs. Aerial map 500 comprises graphical representations of trees 540 and 550, ponds 510, 515 and 520, existing structures 525, 530, road 505 and fence line 521. The graphical representations may be in the form of line drawings coded with various patters related to height, density or material and may also include aerial photographic images.

FIG. 6 shows an overlay that includes a plat map graphics section of the worksite associated with the site development engineering discipline. Plat map 600 describes a set of individual plats 620 of a proposed residential community, as well as key features such as existing structures 525, 530 and road 505.

Figure 7A:
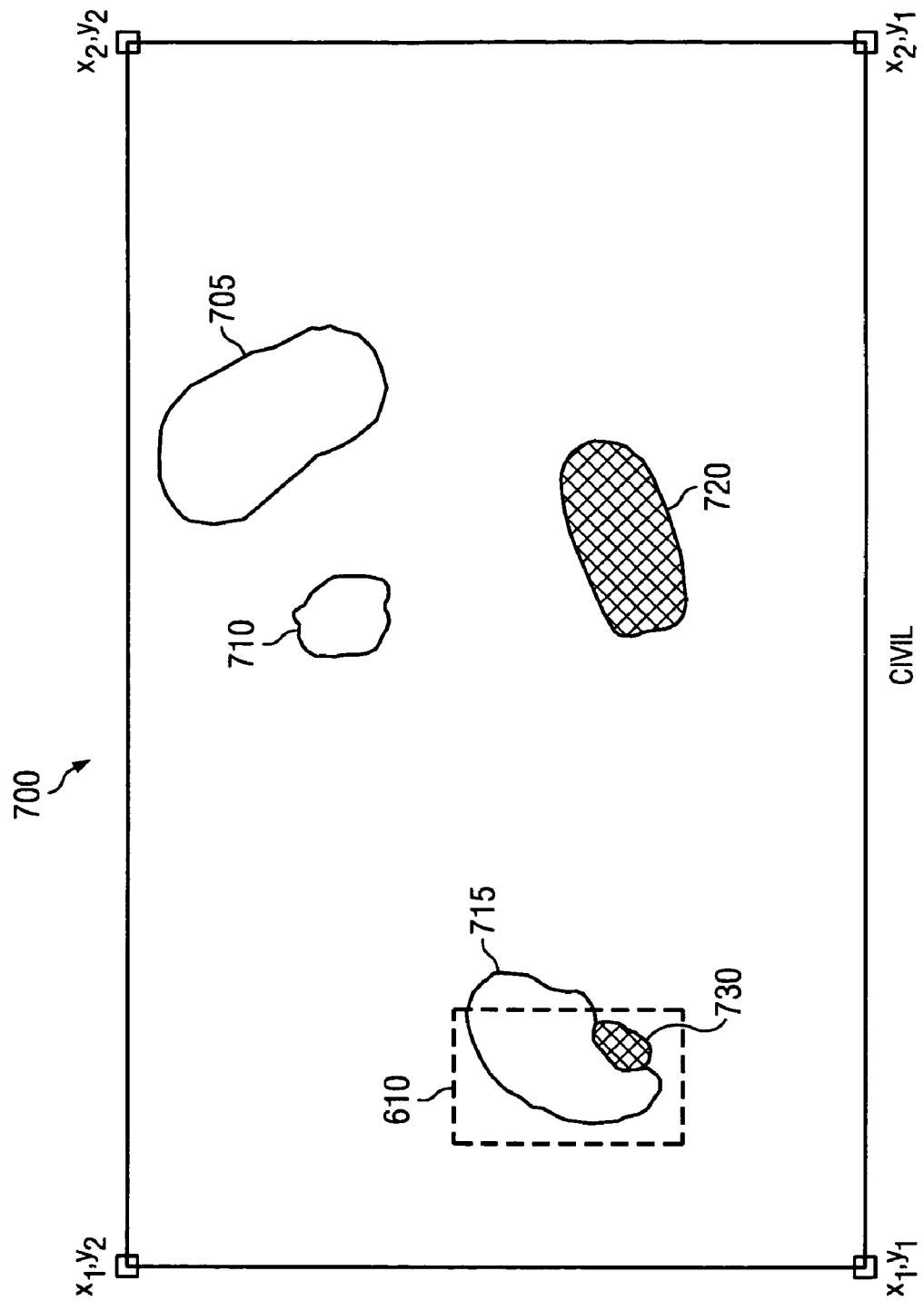

FIG. 7A shows a fill map 700 including graphics section for a fill overlay of the worksite associated with the civil engineering discipline. In relation to construction activity on the worksite, fill areas 705, 710, 715 required fill material to be added to level ponds 510, 515, and 520, respectfully; cut areas 720 and 730 require removal of material to ensure a proper grade on which to build.

Electrical soil resistivity measurements may be made to determine the soil moisture content and underground water formations of a given area. Soil resistivity measurements play an important role in assessing the suitability of constructing a building.

Figure 9:
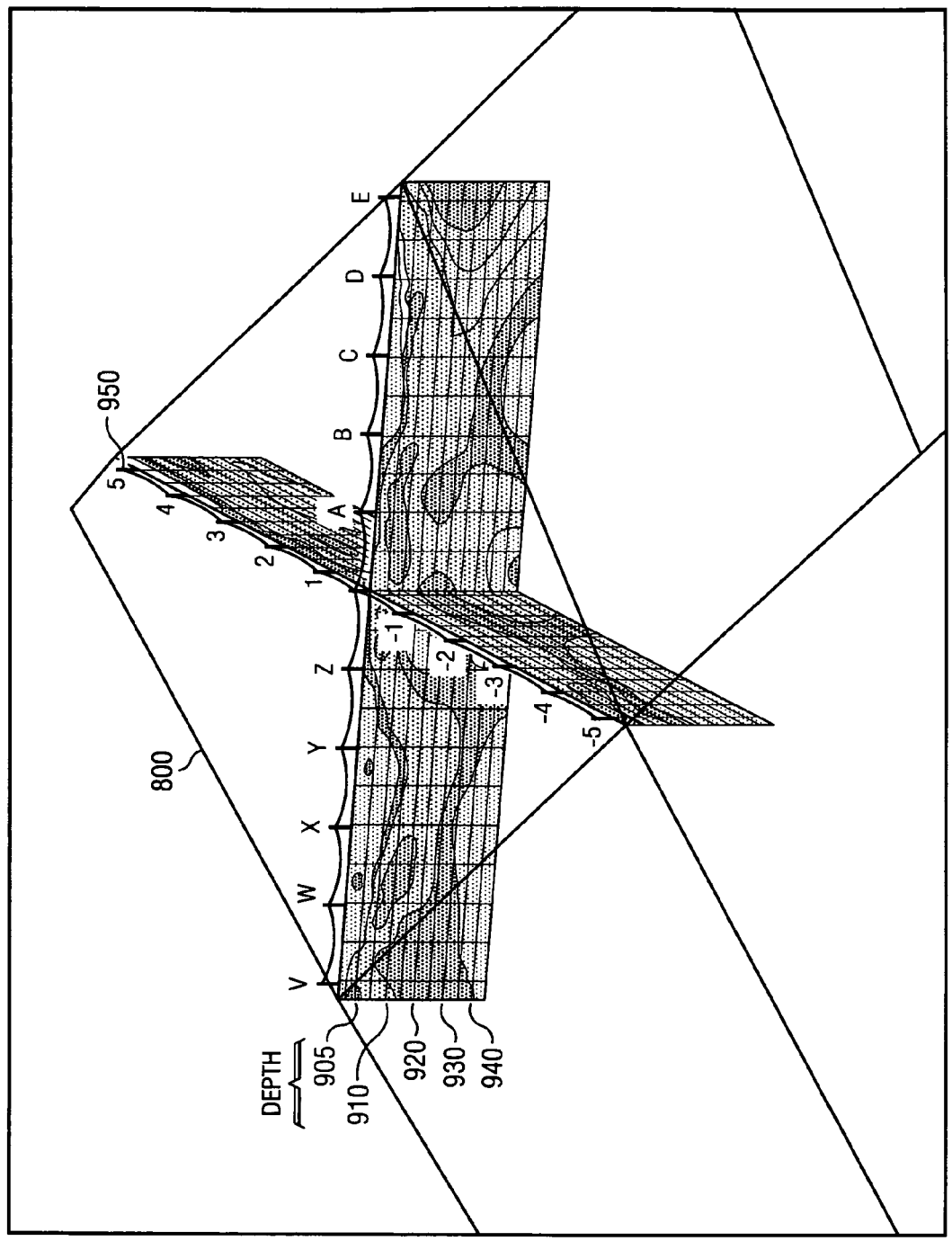

FIG. 9 shows a cross-section of two intersecting vertical plots of resistivity data. Resistivity data is collected from electrical test stakes 950 placed in the ground on a grid labeled V-Z and A-E in a first horizontal direction and labeled −5 to 0 and 0 to +5 in a second horizontal direction. Current is injected at various points on and near the stakes during the data collection. Various methods of obtaining vertical plots of resistivity data exist in the art. One example is described in U.S. Pat. No. 6,295,512, entitled "Subsurface Mapping" to Bryant, incorporated herein by reference. The collected resistivity data can be organized to show horizontal resistivity maps indicating equipotential contours at specific depths 905, 910, 920, 930 and 940. The resistivity data indicates equipotential contours indicative of area of high and low resistivity. It is known in the art that low resistivity often indicates ground water and hazardous conditions.

Figure 10C:
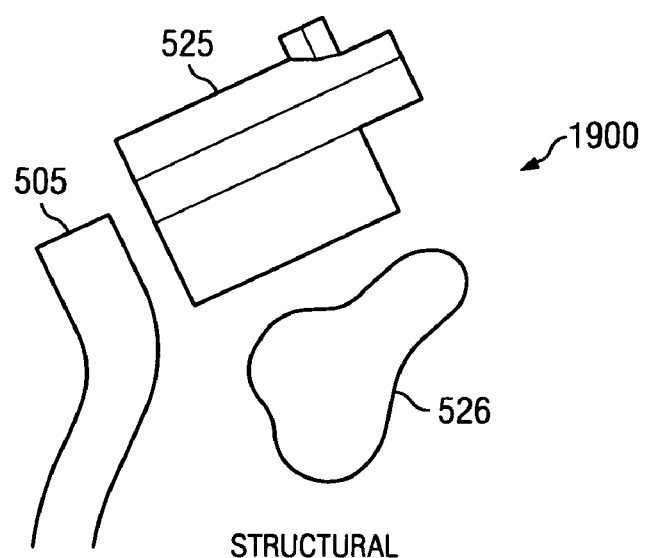
FIG. 10C shows a partial view of structural engineering map overlay.
Figure 10B:
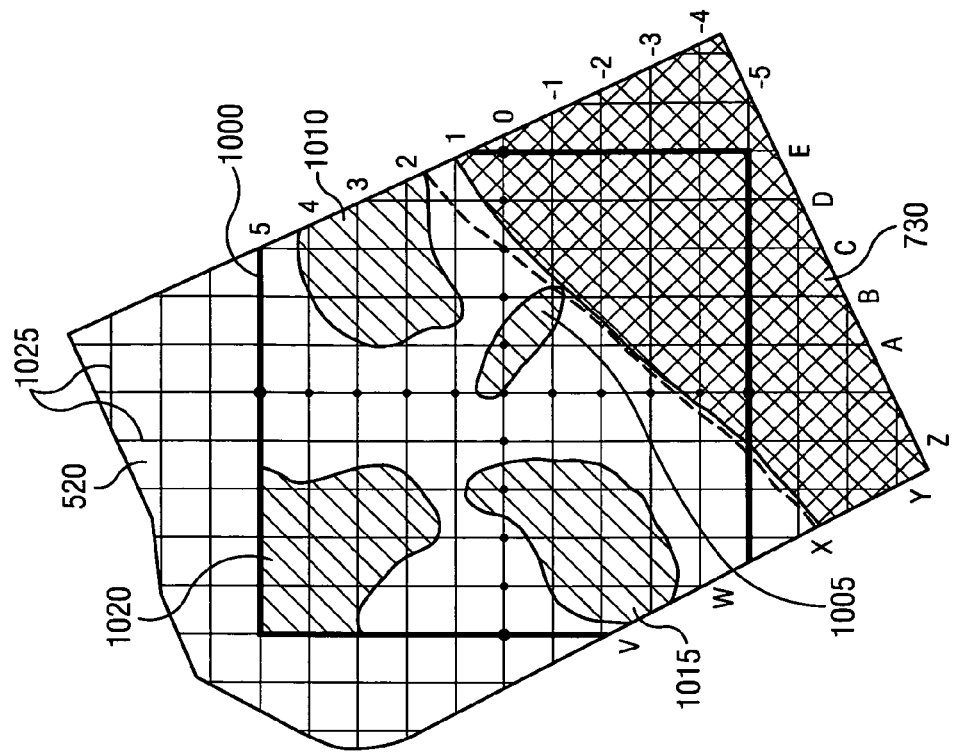
Figure 10A:
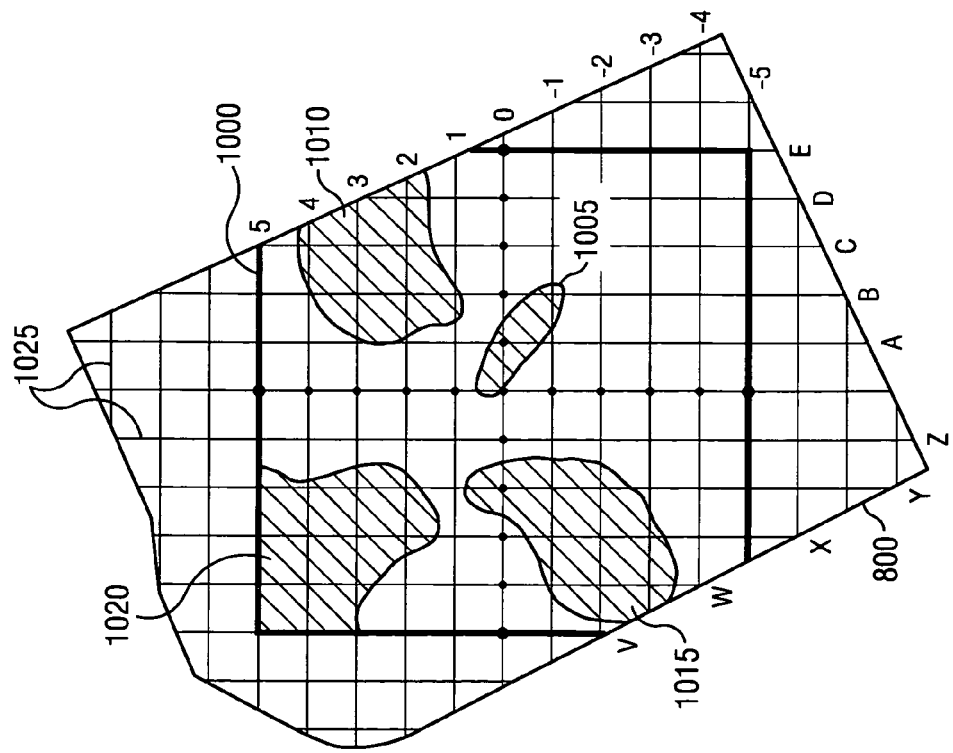

FIG. 10A shows a horizontal resistivity map graphical section for a resistivity overlay for lot 800 for the geotechnical engineering discipline. FIG. 10B shows the horizontal resistivity map 1000 when overlaid with aerial map 500, plat map 600 and fill map 700 for lot 800. Horizontal resistivity map 1000 shows a cross section of resistivity data chosen at one specific depth selected from depths 905, 910, 920, 930 or 940. Formations 1005, 1010, 1015 and 1020 represent various geological formations and moisture contents for a specific depth. Horizontal resistivity map 1000 includes a set of grid lines 1025 labeled horizontally from −5 to 0 and 0 to +5 and vertically from V to Z and A to E, allowing for determinations of specific areas that may require conditioning prior to building.

Referring now to FIG. 10C, a structural engineering map is shown. The structural engineering map includes plan drawings for all existing structures relevant to the site. In this example, structural engineering map 1900 includes structure 525, concrete feature 526, and road 505. Other structural features such as foundations, retaining walls and road grading can be included as well as other structural features. The structural engineering map is associated with overlay 125 for the structural engineering discipline.

Referring again to FIG. 11, the use of the preferred embodiment will be described. Set of overlays 150 are viewed simultaneously as represented in the overlaid graphics section 1105 and overlaid data response section 1110. The overlays provide a tool for ready analysis of various types of data along with information provided visually in overlaid graphics section 1105 and in response to the progress shown based on questions and responses in the overlaid data response section 1110. Overlaid key section 1112 provides ready access to the key code, risks and questions associated with the risks.

As a project begins, each of the overlays is prepared by a project manager or an engineering professional in charge of a specific engineering discipline. The various maps are located and scaled. Also, photographic information for the geographic area covered by the coordinates is abstracted into a set of line drawings. Cross hatching or colors may be added to various features according to a legend (not shown). Revision numbers are recorded. The set of overlays is then assembled using the binder and then distributed to project management and engineering staff. The set of overlays viewed simultaneously form dark and/or significantly colored areas in the graphics section that indicate certain geographic risk areas may be present. The geographic areas corresponding to the risk areas may need special attention and project management to mitigate project risk. Similarly, the set of overlays combine to form light or dark response boxes in overlaid data response section 1110 that serve to alert the viewer that certain contractors working on the project have or have not addressed questions or tasks that serve to mitigate the project risk. Each viewer of the completed set of overlays, when indexed, can readily observe the number of red blocks, yellow blocks and green blocks contained in the response boxes in the risk data section. These numbers, when divided by the total provide a quick statistical method of analyzing the project "risk".

Figure 7B:
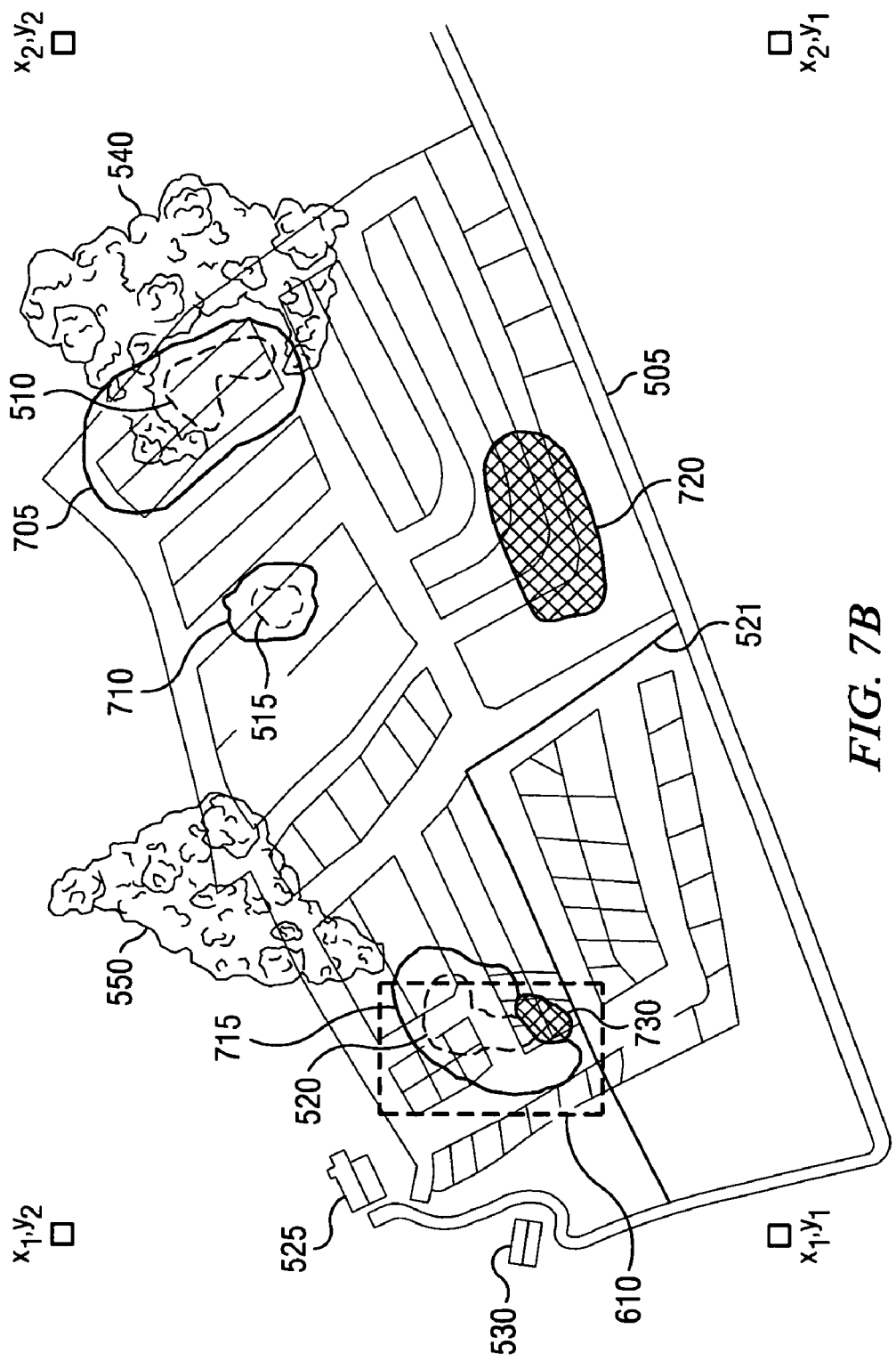

FIG. 7B shows the graphics section of an overlay combination of fill map 700, aerial map 500 and plat map 600. Aerial map 500 and plat map 600 indicate features such as ponds 510, 515 and 520, individual plats 620 within building site 610. Additional features are added by fill map 700 such as fill areas 705, 710, 715 and cut areas 720, 730.

When viewed in combination, the aerial, plat and fill overlays identify several areas of interest where graphical information overlap to aid in decision making. One such area of interest is building site 610, which includes pond 520, fill area 715 and cut area 730.

Figure 8:
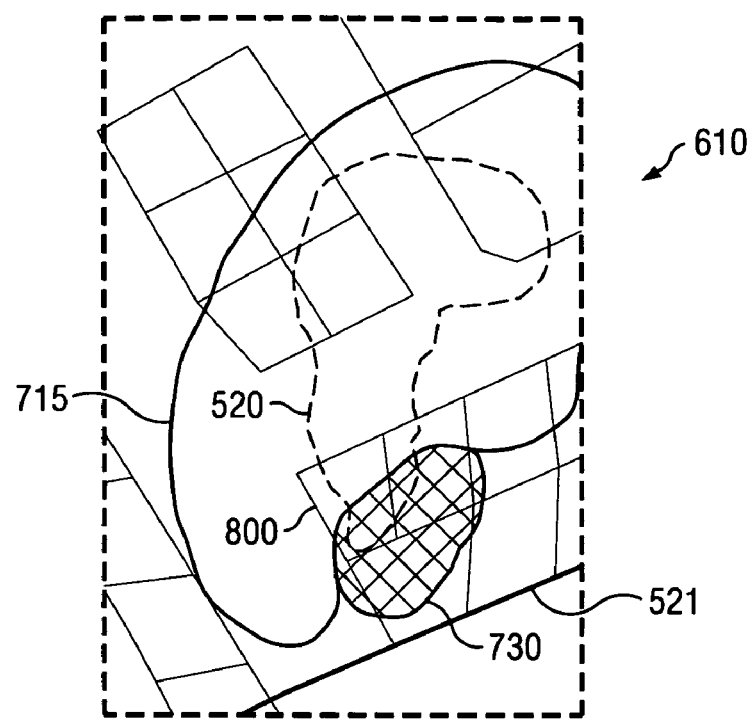

FIG. 8 shows an enlarged view of building site 610. Lot 800 is an area of interest for electrical resistivity measurement due to fill area 715 and cut area 730 required to create a proper grade for construction. There is potential for moist soil conditions presented by ponds 510, 515, 520 filled by fill areas 705, 710, 715 which poses a risk to any potential building built on lot 800.

Figure 13:
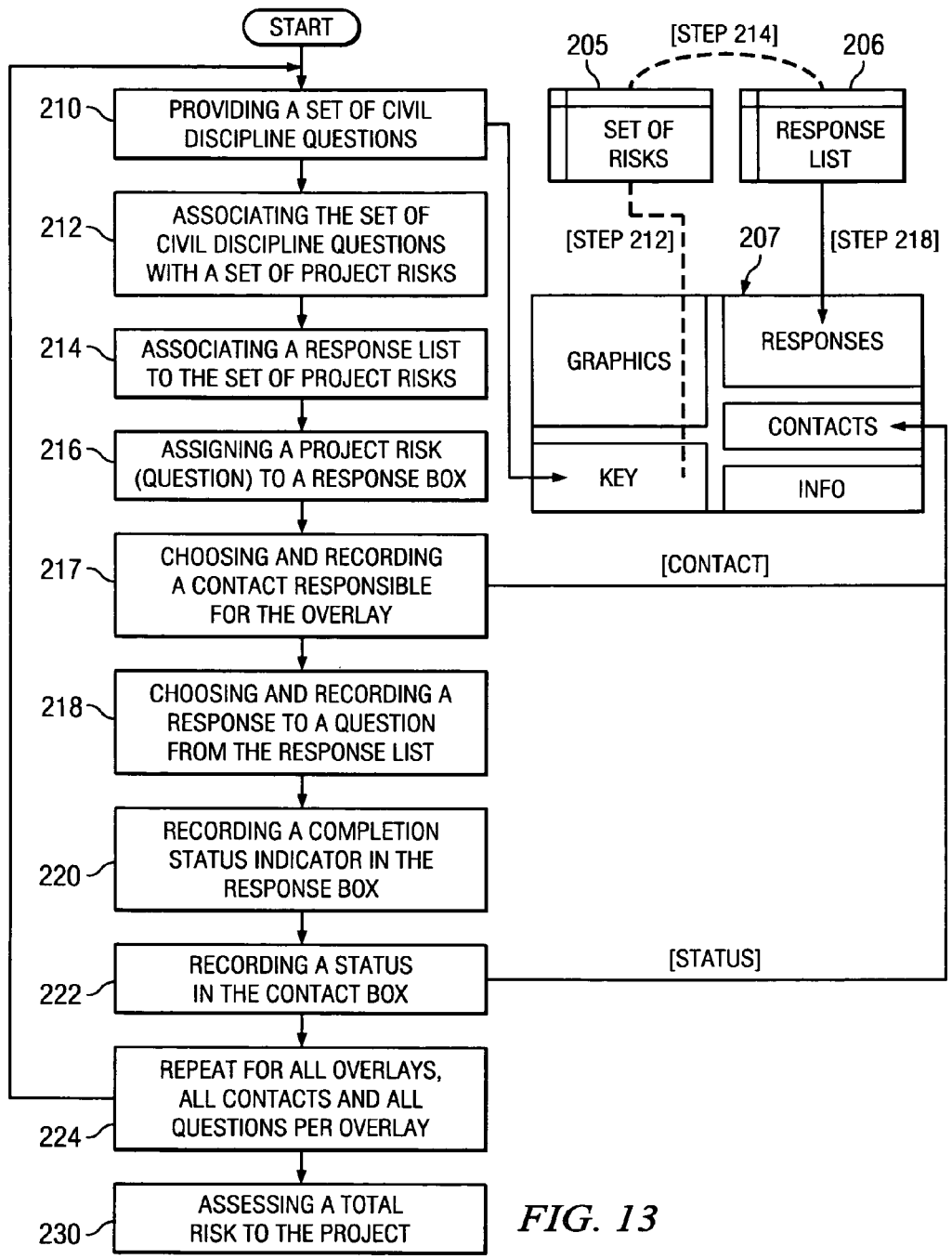
FIG. 13 shows a flow chart of a method of a preferred embodiment.

FIG. 13 is a flowchart of a method for using the transparency system to assess project risk for a geotechnical construction project. The method utilizes the apparatus of FIGS. 1-4: a geotechnical overlay 207 comprising a graphics section, key section, responses section, contacts section, and identification section. There is an identified set of risks 205 and a response list 206 from which responses to a set of questions contained in the key section may be selected.

The method begins in step 210 of providing a first set of civil discipline questions for a first geotechnical overlay. The first set of civil discipline questions are provided in the key section and are preferably chosen from those questions shown in Table 1 associated to the geotechnical area of interest for the first geotechnical overlay. Each question in the first set of questions has a question id number. The first set of civil discipline questions is a associated to a set of project risks in step 212, each project risk being labeled with a risk id number. A response list is associated to each question and to each project risk in step 214, wherein a set of responses for "Yes", "No", "Skip", "DNK" are provided as risk id numbers as shown in Table 1. A preferred response list is shown in Table 2. In step 216, a question from the first set of civil discipline questions is then associated to a response box in the first geotechnical overlay. In step 217, a contact responsible for providing the answers to the questions is chosen and recorded in the contacts area of the first geotechnical overlay.

When some action has occurred on the project requiring a response in the first geotechnical overlay, step 218 is performed, where a user chooses and records a response from the response list associated to a response box. Then in step 220, a completion status indicator is filled out in the response box, such as a green check mark, a yellow warning sign or a red stop sign, wherein the green check mark indicates a completed item and the yellow warning sign and red stop sign indicate uncompleted items. The red stop sign may indicate that the associated risk needs immediate attention. The method continues in step 222 by recording a status in the contact box as "status inactive" or "status active".

The method is repeated in step 224 for all questions in the first geotechnical overlay and then for all additional geotechnical overlays, iterating over all additional sets of discipline questions in each additional geotechnical overlay. In the preferred embodiment there are five geotechnical overlays, one each for civil discipline code, site development code, environmental code, geotechnical code and structural code. Alternate embodiments may include other construction related codes or a subset of the five preferred geotechnical overlays.

Step 230 completes the assessment of project risk by placing the overlays in a binder or on a light table and examining the completion status indicators in the response section. At a glance, a project manager can ascertain which questions are impeding the project and presenting risk to the project. The project manager can also ascertain which contacts are responsible for those questions and communicate as needed.

Figure 12:
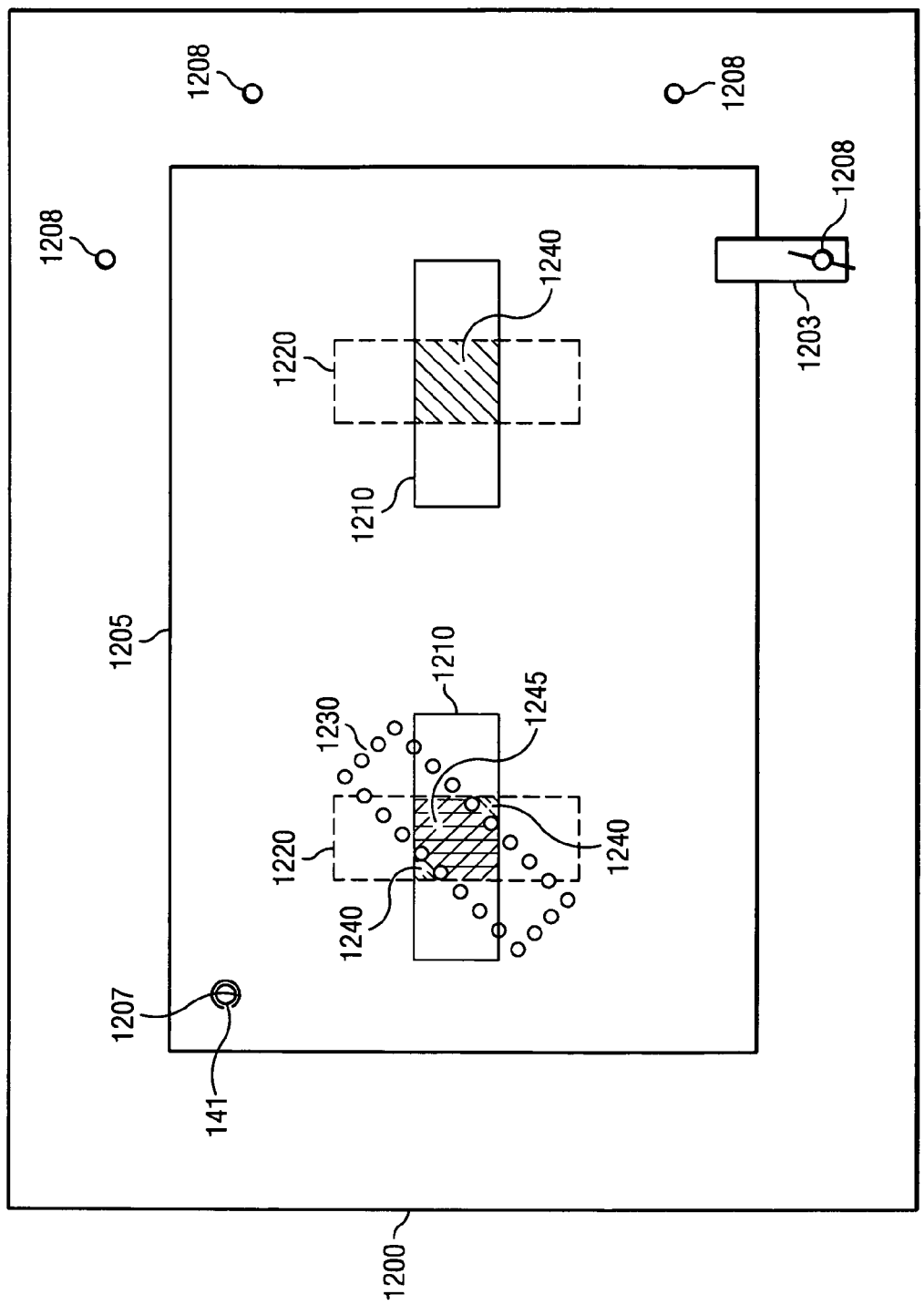
FIG. 12 shows an alternate embodiment.

FIG. 12 shows an alternate embodiment of the invention. A light table 1200 has a retaining pin 141 fastened perpendicular to its top surface for folding a transparency system 1205. Transparency system 1205 comprises a set of overlays, each overlay having a through hole 1207 to allow for registration on retaining pin 141. FIG. 12 describes three layers of overlays; however any number of overlays is possible. Individual overlays are transparent with translucent objects printed on them. A first set of translucent objects 1210 are printed on a first overlay, a second set of translucent objects 1220 are printed on a second overlay and a third set of translucent objects 1230 are printed on a third overlay. The translucent objects may be graphics, written data and other non-transparent markings residing on the overlay. Light table 1200 preferably includes a set of lamps for illuminating the overlays from below while the overlays are typically viewed from the top. Clamps may optionally be included for holding the overlays stationary, for example clamp 1203, by providing threaded holes at clamp positions 1208.

In use, light table 1200 passes light through each individual overlay of transparency system 1205 allowing the graphics, written data and markings to be seen through multiple overlays. However, as markings appear in coincident locations on multiple overlays, the areas having coincident markings appear darker in proportion to the number of overlays. This darkening effect is shown as first-second overlay interference 1240 and first-second-third overlay interference 1245.

The effect of multiple layers of markings can be used to produce colors indicating areas requiring additional attention. Each overlay of transparency system 1205 may have data in only a single translucent color. This allows for combining multiple colors to provide warning signs of specific events. For example, if the translucent objects 1210 on the first overlay were yellow and the translucent objects 1220 on the second overlay were blue: when viewed as a combination, the first-second overlay interference 1240 would appear as green.

The use of translucent overlays of different color can serve to pass important information. For example, if the aerial overlay of FIG. 5 is placed directly on light table 1205 and the fill overlay of FIG. 7A is placed on top of the aerial overlay, then first-second overlay interference 1240 would be where ponds 510, 515, 520 intersect with fill areas 705, 710, 715. If the ponds are printed as translucent yellow objects on FIG. 5 and the fill areas are printed as translucent blue objects on FIG. 7A, then first-second overlay interference 1240 would show as green, providing a visual cue to areas requiring electrical resistivity mapping, the results of which may be overlaid as an aid to further identify the condition of the soil near the worksite prior to building.

Although the invention has been described with reference to one or more preferred embodiments, this description is not to be construed in a limiting sense. There is modification of the disclosed embodiments, as well as alternative embodiments of this invention, which will be apparent to persons of ordinary skill in the art, and the invention shall be viewed as limited only by reference to the following claims.

The invention claimed is:

1. A method for generating a risks assessment for a geotechnical construction project, the method comprising the steps of:
    providing a set of geotechnical overlays;
    providing a set of civil discipline questions on the set of geotechnical overlays;
    providing a set of response boxes associated with the set of civil discipline questions on the set of geotechnical overlays, such that when the set of geotechnical overlays are indexed, each response box of the set of response boxes appears in a different lateral position, with respect to the other response boxes in the set of response boxes;
    providing a set of contact boxes on the set of geotechnical overlays, such that when the set of geotechnical overlays are indexed, each contact box in the set of contact boxes appears in a different lateral position;
    associating the set of civil discipline questions with a set of project risks and the set of response boxes;
    associating a response list, including a set of risk codes, with each risk in the set of project risks;
    providing a set of completion status indicators for the set of project risks;
    choosing at least one contact code from a set of contact codes associated with a set of contacts;
    recording the at least one contact code in at least one contact box;
    choosing an answer from the response list for a selected civil discipline question in the set of civil discipline questions;
    recording the answer in a selected response box in the set of response boxes associated with the selected civil discipline question as a recorded response in a set of recorded responses;
    recording a completion status indicator in the set of completion status indicators in the selected response box as one recorded status indicator in a set of recorded status indicators;
    repeating the steps of choosing an answer and recording the answer for the set of civil discipline questions on the set of geotechnical overlays;
    generating a combined view of the set of response boxes, the set of contact boxes, the set of recorded responses, and the set of recorded status indicators by aligning and fixing together each overlay of the set of geotechnical overlays and indexing the set of geotechnical overlays;
    assessing a total risk to the geotechnical construction project based on the combined view of the set of response boxes, the set of contact boxes, the set of recorded responses, and the set of recorded status indicators by examining a set of completion status indicators present in the combined view created by the indexed geotechnical overlays.

2. The method of claim 1 wherein the step of providing a set of civil discipline questions further comprises the steps of:
    providing a first set of civil discipline questions containing a civil discipline code on a first geotechnical overlay;
    providing a second set of civil discipline questions containing a site development discipline code on a second geotechnical overlay;
    providing a third set of civil discipline questions containing an environmental discipline code on a third geotechnical overlay;
    providing a fourth set of civil discipline questions containing a geotechnical discipline code on a fourth geotechnical overlay; and
    providing a fifth set of civil discipline questions containing a structural discipline code on a fifth geotechnical overlay.

3. The method of claim 2 wherein the step of placing the set of response boxes on the set of geotechnical overlays further comprises the steps of:
    providing a response box associated with the first set of civil discipline questions on the first geotechnical overlay;
    providing a response box associated with the second set of civil discipline questions on the second geotechnical overlay;
    providing a response box associated with the third set of civil discipline questions on the third geotechnical overlay;
    providing a fourth response box associated with the fourth set of civil discipline questions on the fourth geotechnical overlay; and
    providing a fifth response box associated with the fifth set of civil discipline questions on the fifth geotechnical overlay.

4. The method of claim 2 wherein the step of placing a set of contact boxes on the set of geotechnical overlays further comprises the steps of:
    placing a first contact box on the first geotechnical overlay;
    placing a second contact box on the second geotechnical overlay;
    placing a third contact box on the third geotechnical overlay;
    placing a fourth contact box on the fourth geotechnical overlay; and,
    placing a fifth contact box on the fifth geotechnical overlay.

5. The method of claim 1 comprising the additional steps of:
   providing a set of user identifications adjacent the set of contact codes, wherein each user identification is associated with at least one contact in the set of contacts; and,
   associating the set of contact codes to one or more of the group of: the civil discipline code, the site development code, the environmental code, the geotechnical code and the structural code.

6. The method of claim 1 wherein the step of recording at least one completion status indicator includes a step chosen from the group of:
   recording a red stop sign as an uncompleted risk area;
   recording a yellow warning sign as an uncompleted risk area; and,
   recording a green check mark as a completed risk area.

7. The method of claim 6 wherein the step of assessing a total risk to the geotechnical construction project based on the combined view comprises the additional steps of:
   counting a number of completed risk areas in the set of response boxes;
   counting a number of uncompleted risk areas in the set of response boxes;
   comparing the number of uncompleted risk areas to the number of completed risk areas.

8. The method of claim 7 including the additional step of looking up a contact associated to an uncompleted risk from a contact box in the set of contacts.

9. The method of claim 1 wherein the step of associating a response list to each risk in the set of project risks further includes the step of associating a set of tasks with the set of project risks.

* * * * *